United States Patent
Mitani et al.

(10) Patent No.: US 10,923,257 B2
(45) Date of Patent: Feb. 16, 2021

(54) POWDER MIXTURE FOR POWDER MAGNETIC CORE, AND POWDER MAGNETIC CORE

(71) Applicant: Kobe Steel, Ltd., Kobe (JP)

(72) Inventors: Hiroyuki Mitani, Kobe (JP); Hirofumi Hojo, Takasago (JP); Yuji Taniguchi, Takasago (JP); Satomi Sato, Takasago (JP)

(73) Assignee: Kobe Steel, Ltd., Kobe (JP)

(*) Notice: Subject to any disclaimer, the term of this patent is extended or adjusted under 35 U.S.C. 154(b) by 57 days.

(21) Appl. No.: 15/578,914

(22) PCT Filed: Apr. 27, 2016

(86) PCT No.: PCT/JP2016/063171
§ 371 (c)(1),
(2) Date: Dec. 1, 2017

(87) PCT Pub. No.: WO2016/194525
PCT Pub. Date: Dec. 8, 2016

(65) Prior Publication Data
US 2018/0182520 A1    Jun. 28, 2018

(30) Foreign Application Priority Data
Jun. 4, 2015  (JP) .............................. JP2015-113915

(51) Int. Cl.
*B32B 15/01* (2006.01)
*H01F 1/24* (2006.01)
(Continued)

(52) U.S. Cl.
CPC ................. *H01F 1/24* (2013.01); *B22F 1/00* (2013.01); *B22F 1/0003* (2013.01); *B22F 1/007* (2013.01);
(Continued)

(58) Field of Classification Search
CPC .... B22F 1/00; B22F 1/02; B22F 1/007; B22F 3/00; B22F 3/02; B22F 3/22; B22F 3/004;
(Continued)

(56) References Cited

U.S. PATENT DOCUMENTS 6,139,598 A    10/2000   Narasimhan et al.
6,214,080 B1    4/2001   Narasimhan et al.
(Continued)

FOREIGN PATENT DOCUMENTS

CN      104036902 A      9/2014
JP      2003-183701 A    7/2003
(Continued)

OTHER PUBLICATIONS

Vazirisereshk in "Solid lubrication with MoS2: A Review," in Lubricants 2019, 7, 57; doi:10.3390/lubricants7070057, downloaded from www.mdpi.com/journal/lubricants on Apr. 6, 2020 (Sections 2 and 3). (Year: 2019).*
(Continued)

*Primary Examiner* — Michael E. La Villa
(74) *Attorney, Agent, or Firm* — Oblon, McClelland, Maier & Neustadt, L.L.P.

(57) ABSTRACT

The present invention pertains to: a powder mixture for powder magnetic core obtained by mixing a lubricant, a solid lubricant, and a soft magnetic powder coated with an insulating coating, wherein a lubricant content is 0.1% by mass or more and 0.8% by mass and a solid lubricant content is 0.01% by mass or more and 0.2% by mass or less; and a powder magnetic core in which the powder mixture is used.

7 Claims, 3 Drawing Sheets

(51) Int. Cl.
  *B22F 1/00*    (2006.01)
  *B22F 1/02*    (2006.01)
  *H01F 3/08*    (2006.01)
  *H01F 41/02*   (2006.01)
  *B22F 3/00*    (2021.01)
  *B22F 3/22*    (2006.01)
  *B22F 3/16*    (2006.01)
  *B22F 3/12*    (2006.01)
  *H01F 1/20*    (2006.01)
  *H01F 1/12*    (2006.01)
  *H01F 1/36*    (2006.01)
  *H01F 1/14*    (2006.01)
  *C22C 33/02*   (2006.01)
  *H01F 1/33*    (2006.01)
  *H01F 27/255*  (2006.01)
  *B22F 3/02*    (2006.01)
  *B22F 5/10*    (2006.01)

(52) U.S. Cl.
  CPC .............. *B22F 1/0059* (2013.01); *B22F 1/02* (2013.01); *B22F 1/025* (2013.01); *B22F 3/00* (2013.01); *B22F 3/004* (2013.01); *B22F 3/12* (2013.01); *B22F 3/16* (2013.01); *B22F 3/22* (2013.01); *B32B 15/01* (2013.01); *B32B 15/011* (2013.01); *C22C 33/02* (2013.01); *H01F 1/12* (2013.01); *H01F 1/14* (2013.01); *H01F 1/20* (2013.01); *H01F 1/33* (2013.01); *H01F 1/36* (2013.01); *H01F 3/08* (2013.01); *H01F 27/255* (2013.01); *H01F 41/0246* (2013.01); *B22F 3/02* (2013.01); *B22F 5/106* (2013.01); *B22F 2003/023* (2013.01); *B22F 2301/35* (2013.01); *B22F 2998/10* (2013.01); *C22C 2202/02* (2013.01); *Y10T 428/12181* (2015.01); *Y10T 428/12465* (2015.01); *Y10T 428/12951* (2015.01); *Y10T 428/256* (2015.01); *Y10T 428/257* (2015.01); *Y10T 428/29* (2015.01); *Y10T 428/2991* (2015.01)

(58) Field of Classification Search
  CPC .......... B22F 3/12; B22F 3/16; B22F 2301/35; B22F 1/0003; B22F 1/0059; B22F 1/025; B22F 2003/023; B22F 2998/10; B22F 5/106; B22F 2003/248; H01F 1/24; H01F 3/08; H01F 41/0246; H01F 1/12; H01F 1/14; H01F 1/33; H01F 1/20; H01F 1/36; H01F 27/255; B32B 15/01; B32B 15/011; C22C 33/02; C22C 2202/02; Y10T 428/12951; Y10T 428/12181; Y10T 428/12465; Y10T 428/256; Y10T 428/257; Y10T 428/29; Y10T 428/2991
  See application file for complete search history.

(56) References Cited

U.S. PATENT DOCUMENTS

| | | | |
|---|---|---|---|
| 2003/0061905 | A1 | 4/2003 | Wang et al. |
| 2004/0191519 | A1* | 9/2004 | Kejzelman ............ B22F 1/0059 428/407 |
| 2007/0123436 | A1 | 5/2007 | Kato et al. |
| 2007/0290161 | A1* | 12/2007 | Tokuoka ............... B22F 1/0059 252/62.54 |
| 2009/0042051 | A1* | 2/2009 | Skarman ............... B22F 1/0062 428/548 |
| 2010/0044618 | A1 | 2/2010 | Ishimine et al. |
| 2013/0210687 | A1 | 8/2013 | Suzuki et al. |

FOREIGN PATENT DOCUMENTS

| | | |
|---|---|---|
| JP | 2006-100813 A | 4/2006 |
| JP | 2008-202123 A | 9/2008 |
| JP | 2010-216016 A | 9/2010 |
| JP | 2012-67334 A | 4/2012 |
| JP | 2012-111987 A | 6/2012 |
| WO | WO 2009/034894 A1 | 3/2009 |
| WO | WO2009/116938 | 9/2009 |
| WO | WO2011/032931 | 3/2011 |

OTHER PUBLICATIONS

The English translation of The International Preliminary Report on Patentability and Written Opinion dated Dec. 14, 2017 in PCT/JP2016/063171.

International Search Report dated Jul. 19, 2016 in PCT/JP2016/063171 filed Apr. 27, 2016.

CRC Handbook of Chemistry and Physics, 87th Edition, 2006-2007, (Section 4), David R.Lide (4 pages).

\* cited by examiner

POWDER MIXTURE FOR POWDER MAGNETIC CORE, AND POWDER MAGNETIC CORE

TECHNICAL FIELD

The present invention relates to a powder mixture for powder magnetic core, obtained by mixing a lubricant and a soft magnetic powder having an insulating coating formed on its surface, and a powder magnetic core obtained by compression molding using the powder mixture for the powder magnetic core.

BACKGROUND ART

Electromagnetic steel sheets, powder magnetic cores, soft ferrites, and the like are used for iron cores of electromagnetic devices used in alternating current magnetic fields such as noise filters and reactors. In all cases, it is necessary to suppress an eddy current generated in the iron core in an alternating current magnetic field. The eddy current is suppressed by forming an insulating coating on the plate surface of the electromagnetic steel sheet and on the powder surface of the powder magnetic core, respectively. In addition, since the soft ferrite is an oxide, the electric resistance of the material itself is high, and thus it is not necessary to form an insulating coating in the case of the soft ferrite.

Among them, the use of a powder magnetic core obtained by compression molding of a soft magnetic powder as an iron core of an electromagnetic device has been increasing particularly in recent years. The powder magnetic core is formed by compression molding of a soft magnetic powder having an insulating coating formed on its surface, but the magnetic characteristics thereof largely depend on the compact density, and it is necessary to form the powder magnetic core at a high density while securing electrical insulation between particles to obtain high magnetic characteristics.

Here, the magnetic characteristics refer to magnetic flux density, magnetic permeability, iron loss, etc. When electrical insulation between particles is secured, an interparticle eddy current loss generated between particles is suppressed. As a result, an eddy current loss is only an intraparticle eddy current loss generated inside particles, and thus the eddy current loss is minimized. Therefore, for the characteristics of the powder magnetic core obtained by compression molding of a soft magnetic powder coated with an insulating coating, the direct current magnetic characteristics represented by magnetic flux density and magnetic permeability are important characteristics.

Since saturated magnetic flux density is proportional to the amount of iron, it depends on the compact density. In addition, since the magnetic permeability is an inclination of an initial magnetization curve and is an index representing easiness of passing the magnetic flux, the magnetic permeability becomes higher as the number of the gaps that become magnetoresistance is smaller, and similarly to the saturation magnetic flux density, the magnetic permeability becomes higher as the compact density becomes higher.

Further, high magnetic permeability means that the magnetic flux density at a certain excitation magnetic field is high, and not only the saturation magnetic flux density but also the magnetic flux density can be improved by increasing the compact density. Therefore, for improving the direct current magnetic characteristics, it is most important to increase the compact density.

As described above, the powder magnetic core is obtained by compression molding of a soft magnetic powder having an insulating coating formed thereon, i.e., the powder magnetic core is obtained by filling a soft magnetic powder in a mold, followed by compression molding. A lubricant is used to prevent seizure with the mold in molding.

There are roughly two ways to use a lubricant when preparing a powder magnetic core. One way is an internal lubrication molding (mixed lubrication molding) in which a lubricant is directly mixed with a soft magnetic powder or a soft magnetic powder is coated with a lubricant, and the other is a mold lubrication molding in which a lubricant is applied to the inner surface of a mold. In the mold lubrication molding, there is a problem that it is difficult to form a complicated shape. Therefore, in the case of manufacturing a compact having a complicated shape, an internal lubrication molding, in which a lubricant is mixed with a soft magnetic powder, may be used in combination.

The mold lubrication molding has an advantage that a high compact density can be obtained since a lubricant is not contained inside the compact. However, since the lubricant is applied to the inner wall surface of the mold, the shape of the compact is restricted, and thus the mold lubrication molding is not a suitable method for forming complex shapes. On the other hand, there remains a problem that a high compact density cannot be obtained in the internal lubrication molding. Under such circumstances, the development of a technique for increasing the compact density even when adopting the internal lubrication molding suited for forming complex shapes has been desired.

Techniques described in Patent Documents 1 and 2 are known as examples in which a lubricant is used in producing a green compact, but lubricants used in these techniques are only organic lubricants.

On the other hand, examples in which an organic lubricant and a solid lubricant are used together in producing a sliding part such as a valve guide used at high temperature are disclosed in Patent Documents 3 to 5. However, the key of these techniques is to leave the solid lubricant after sintering, and such techniques are not intended to improve the compact density by improving the compaction property.

The present invention has been made to solve the above-mentioned conventional problems, and it is an object of the present invention to provide a powder mixture for powder magnetic core capable of producing a powder magnetic core excellent in magnetic properties while increasing the compact density even when adopting internal lubrication molding in the production of the powder magnetic core, and provide a powder magnetic core produced by using the powder mixture for powder magnetic core.

CITATION LIST

Patent Literatures

Patent Literature 1: Japanese Patent Application Laid-Open No. 2012-111987
Patent Literature 2: Japanese Patent Application Laid-Open No. 2012-67334
Patent Literature 3: Japanese Patent Application Laid-Open No. 2003-183701
Patent Literature 4: Japanese Patent Application Laid-Open No. 2008-202123
Patent Literature 5: Japanese Patent Application Laid-Open No. 2010-216016

SUMMARY OF THE INVENTION

A powder mixture for powder magnetic core according to an aspect of the present invention is a powder mixture for powder magnetic core obtained by mixing a lubricant, a solid lubricant, and a soft magnetic powder coated with an insulating coating, wherein the lubricant content is 0.1% by mass or more and 0.8% by mass or less and the solid lubricant content is 0.01% by mass or more and 0.2% by mass or less.

DESCRIPTION OF EMBODIMENTS

Figure 1:
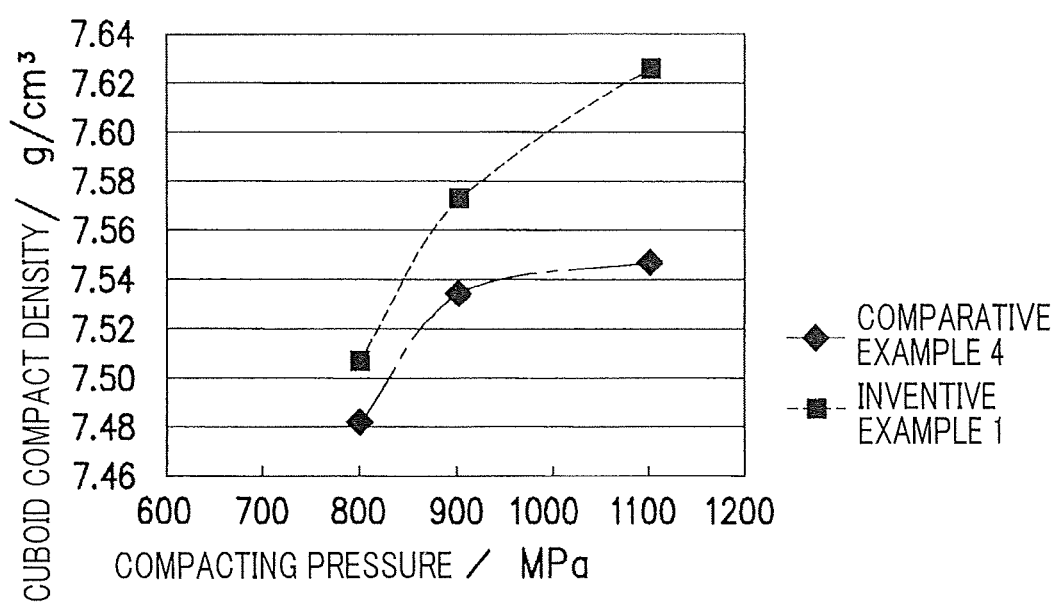
FIG. 1 is a graph illustrating the relationship between the compact density of a powder magnetic core and the compacting pressure at the time of compression molding.

As described above, direct current magnetic characteristics typified by magnetic flux density and magnetic permeability are important characteristics of the powder magnetic core. For improving the direct current magnetic characteristics of the powder magnetic core, it is necessary to increase the amount of a magnetic material per unit volume and to reduce nonmagnetic substances and gaps which serve as magnetoresistance, and it is vital to mold the powder magnetic core at a high density.

A lubricant is a necessary substance for molding, but is not a magnetic material. Therefore, it is useful to reduce the amount of the lubricant as much as possible for obtaining high magnetic properties, and the reduction of the amount of the lubricant leads to the high density of the compact, that is, to high magnetic properties. Although it can be considered to reduce the gaps by increasing the compacting pressure, without reducing the amount of the lubricant, problems in the process such as a heavy burden on the mold occur, because of which such a process cannot be adopted.

As described above, since the lubricant is a material necessary for preventing seizure with the mold at the time of molding, the amount that can be reduced is limited, and it is necessary to achieve both compactibility and reduction of the amount of the lubricant at the same time.

In view of such circumstances, the present inventors have intensively studied research, experiments and the like, and focused on the volume of the lubricant. The present inventors have found that, in order to reduce the volume of the lubricant, it is effective to use a lubricant of high density, and by replacing a part of the lubricant with a solid lubricant of high density, the compactibility and the reduction of the amount of the lubricant can be achieved at the same time, so that the present inventors have completed the present invention.

In addition, as a result of studies on the insulating coating covering the surface of the soft magnetic powder, the present inventors have found that an inorganic insulating coating, particularly a phosphoric acid-based coating, has lubricity. The present inventors have also found that reduction of the amount of the lubricant can be achieved more effectively by adopting a soft magnetic powder coated with a phosphoric acid-based coating as the material for a powder magnetic core.

The powder mixture for powder magnetic core of the present invention is formed by mixing a soft magnetic powder coated with an insulating coating, and a lubricant and a solid lubricant as a lubricant. Hereinafter, embodiments of the present invention will be described in detail in the order of a soft magnetic powder, an insulating coating, a lubricant, and a solid lubricant. However, the present invention is not limited to these embodiments.

(Soft Magnetic Powder)

As the soft magnetic powder, an iron-based soft magnetic powder can be exemplified. The iron-based soft magnetic powder is a ferromagnetic metal powder, specifically, pure iron powder, iron-based alloy powder (Fe—Al alloy, Fe—Si alloy, sendust, permalloy, etc.), amorphous powder, or the like.

Such a soft magnetic powder can be obtained by, for example, preparing fine particles by an atomizing method, reducing the fine particles, and then pulverizing the particles, or the like. In the present embodiment, it is possible to exert the effect of the soft magnetic powder regardless of particle size distribution as long as the particle size is used in principle for ordinary powder metallurgy.

However, the present embodiment is intended to simultaneously improve the compressibility at the time of molding into a compact while suppressing a predetermined iron loss. Therefore, the iron-based soft magnetic powder to be used is preferably an iron-based soft magnetic powder containing a component having a large particle size (for example, a particle size of 250 μm or more and 600 μm or less) in an amount somewhat more than usual. For example, an iron-based soft magnetic powder having a particle size distribution as shown in Table 1 can be exemplified.

The particle size distribution of the iron-based soft magnetic powder shown in Table 1 can be obtained by sieving according to "Method for Determination of Sieve Analysis of Metal Powders" stipulated by Japan Powder Metallurgy Association (JPMA PO2-1992)". Specifically, the sieving is first performed using a sieve with an opening of 600 μm. Then, the sieving is further performed by sequentially using sieves having openings of 250 μm to 45 μm corresponding to the particle sizes shown in Table 1, whereby a desired particle size distribution can be obtained.

TABLE 1

| Particle size | Degree (%) |
| --- | --- |
| 250 μm or more | 21.8 |
| 180-250 μm | 19.7 |
| 150-180 μm | 14.1 |
| 106-150 μm | 20.8 |
| 75-106 μm | 14.1 |
| 63-75 μm | 2.8 |
| 45-63 μm | 5.0 |
| 45 μm or less | 1.7 |

(Insulating Coating)

On the surface of the soft magnetic powder, an insulating coating is formed for suppressing eddy current. This insulating coating is preferably an inorganic insulating coating. Typical examples of the inorganic insulating coating include a phosphoric acid-based coating (phosphoric acid-based chemical coating), and a chromium-based chemical coating. Particularly, the phosphoric acid-based coating has good wettability with respect to the soft magnetic powder, can uniformly coat the surface of the soft magnetic powder, and has lubricating property. Therefore, the phosphoric acid-based coating is used more suitably as an insulating coating in this embodiment.

The insulating coating may be an organic insulating coating made of an organic material such as silicone, or may be a double coating of an organic insulating coating made of an organic material such as silicone and an inorganic insulating coating such as a phosphoric acid-based coating.

The phosphoric acid-based coating can be formed on the surface of the soft magnetic powder by, for example, mixing 1000 parts by mass of water, 193 parts by mass of $H_3PO_4$, 31 parts by mass of MgO, and 30 parts by mass of $H_3BO_3$; diluting the mixture 20 times in water to prepare a treatment solution for a phosphoric acid-based coating; mixing 5 parts by mass of this treatment solution with 100 parts by mass of the soft magnetic powder; and drying the mixture at 200° C. in the atmosphere. The thickness of the phosphoric acid-based coating is 10 to 100 nm.

(Lubricant)

A lubricant among the lubricants to be mixed at the time of compression molding may be, for example, an organic lubricant consisting of an organic compound having a straight chain ($—CH_2—$) structure with 12 or more carbon atoms. An organic lubricant such as a hydrocarbon type, a fatty acid type, a higher alcohol type, an aliphatic amide type, a metal soap type, and an ester type, in addition to a metal stearate such as zinc stearate can be exemplified, and specifically, the following organic lubricants can be included.

Examples of the hydrocarbon-based lubricant include liquid paraffin, paraffin wax, and synthetic polyethylene wax. Examples of the fatty acid-based and higher alcohol-based lubricants include stearic acid and stearyl alcohol, which are relatively inexpensive and have low toxicity.

Examples of the aliphatic amide-based lubricant include fatty acid amides such as stearamide, oleamide, and erucamide, and alkylene fatty acid amides such as methylene bisstearic acid amide and ethylene bisstearic acid amide.

As the metallic soap-based lubricant, a metal stearate among metal soaps is mainly used, and zinc stearate, calcium stearate, lithium stearate or the like may be used.

Examples of ester-based lubricants include stearic monoglyceride of fatty acid alcohol esters.

In the present embodiment, as the lubricant, one or more of the above-mentioned organic lubricants can be selected to be used.

The content of these lubricants in the powder mixture for powder magnetic core of the present embodiment is set to 0.1% by mass or more and 0.8% by mass or less. When the content is less than 0.1% by mass, seizing with a mold occurs during powder compacting. On the other hand, when the content exceeds 0.8% by mass, the compact density decreases, resulting in failure to obtain a powder magnetic core excellent in magnetic properties.

(Solid Lubricant)

A solid lubricant to be mixed together with the lubricant in powder compacting may be for example, an inorganic lubricant consisting of an inorganic compound having a density of 4.0 g/cm³ or more. Specific examples thereof include molybdenum disulfide ($MoS_2$) and zinc oxide (ZnO). In the present embodiment, as the solid lubricant, one or more of the above-mentioned inorganic lubricants can be selected to be used.

Among the lubricants, if the lubricant density is 2.0 g/cm³ or less but the solid lubricant density is not twice or more the lubricant density, the reduction of the amount of the lubricant cannot be achieved effectively. For this reason, the solid lubricant density is set to 4.0 g/cm³ or more.

The particle size of the solid lubricant is preferably 20 nm or more but 20 μm or less. If the particle size of the solid lubricant is less than 20 nm, the solid lubricant enters the unevenness of the surface of the soft magnetic powder or the gaps between the soft magnetic powders, and thus the lubrication function cannot be exhibited. On the other hand, when the particle size of the solid lubricant exceeds 20 μm, the number of particles of the solid lubricant decreases, which makes it impossible to contribute to the reduction of the friction between the soft magnetic powders, as well as to the reduction of the friction between the soft magnetic powder and the mold.

The content of these solid lubricants in the powder mixture for powder magnetic core of the present embodiment is 0.01% by mass or more and 0.2% by mass or less. When the content is less than 0.01% by mass, the replacement of the lubricant with the solid lubricant becomes insufficient, and the direct current magnetic property cannot be improved. On the other hand, when the content exceeds 0.2% by mass, the total amount of the lubricant to be added to maintain the extractability is increased, so the compact density is reduced, resulting reduction of the saturation magnetic flux density.

(Powder Magnetic Core)

Further, the powder magnetic core of the present embodiment can be formed by compression molding in a mold using a powder mixture for powder magnetic core, which is obtained by mixing a lubricant, a solid lubricant, and a soft magnetic powder coated with an insulating coating, and then by heat annealing.

Although the present specification discloses techniques of various aspects as described above, main techniques among them are summarized below.

The powder mixture for powder magnetic core according to an aspect of the present invention is a powder mixture for powder magnetic core obtained by mixing a lubricant, a solid lubricant, and a soft magnetic powder coated with an insulating coating, in which the lubricant content is 0.1% by mass or more and 0.8% by mass or less, and the solid lubricant content is 0.01% by mass or more and 0.2% by mass or less.

With such a configuration, the compact density can be increased even when the internal lubrication molding is adopted in the production of a powder magnetic core, so that a powder magnetic core excellent in magnetic properties can be obtained.

In addition, the insulating coating is preferably a phosphoric acid-based coating. Thereby, wettability to the soft magnetic powder is favorable, and it is possible to uniformly coat the surface of the soft magnetic powder. Also, since the phosphoric acid-based coating has lubricity, a favorable insulating coating can be obtained.

The lubricant is preferably an organic lubricant consisting of an organic compound having a straight chain structure with 12 or more carbon atoms, and the solid lubricant is preferably an inorganic lubricant consisting of an inorganic compound having a density of 4.0 g/cm³ or more. As a result, it is considered that the amount of lubricant can be effectively reduced, and the above effects can be more reliably obtained.

The solid lubricant is preferably in the form of a powder having a particle size of 20 nm or more and 20 μm or less. Thereby, the lubrication function can be effectively exhibited, and the friction between the soft magnetic powders and the friction of the soft magnetic powder against the mold can be effectively reduced.

The powder magnetic core according to another aspect of the present invention is a powder magnetic core obtained by compression molding of the powder mixture for powder magnetic core, followed by heat annealing.

EXAMPLES

Hereinafter, the present invention will be described in more detail with reference to examples. The present invention is not limited to the following examples, and can be implemented with appropriate modifications within the scope adaptable to the gist of the present invention, and all those modifications are included in the technical scope of the present invention.

As a soft magnetic powder, pure iron powder (MAGMEL (registered trademark) ML35N, manufactured by Kobe Steel, Ltd.) was used to form a phosphoric acid-based coating which serves as an insulating coating on its surface. For forming the phosphoric acid-based coating, 1000 parts by mass of water, 193 parts by mass of $H_3PO_4$, 31 parts by mass of MgO, and 30 parts by mass of $H_3BO_3$ were mixed as a treatment solution for the phosphoric acid-based coating to prepare a stock solution. The stock solution, whose concentration was suitably diluted up to 20 times with water to change the electric resistance, was used as a treatment solution. Five parts by mass of the treatment solution was mixed with 100 parts by mass of pure iron powder, and dried at 200° C. in the atmosphere to form a phosphoric acid-based coating on the surface of the pure iron powder.

Thereafter, the pure iron powder having the phosphoric acid-based coating formed on the surface obtained above, a lubricant (stearamide (18 carbon atoms) or lauramide (12 carbon atoms)), and a solid lubricant (ZnO (density: 5.6 g/cm$^3$) having a particle size of 0.5 μm or $MoS_2$ (density 5.06 g/cm$^3$) having a particle size of 0.5 μm) only in inventive examples were mixed while varying the contents as shown in Table 2, and then the mixture was subjected to powder compacting by internal lubrication molding to prepare a powder magnetic core.

The compact density, extraction pressure, magnetic permeability and magnetic flux density of each of the prepared various powder magnetic cores were measured.

The mass and size of a cuboid test piece as formed (before heat treatment) was measured to calculate the compact density from the volume and the mass. The size of the cuboid test piece is 12.7 mm×31.75 mm x approximately 5 mm thick, and the powder mass (single weight) to be filled is 15 g.

The thickness of the cuboid test piece was set to "approximately" because the thickness varies depending on the compacting pressure. The compact density shown in Table 2 is a compact density when the compacting pressure is 900 MPa. The height of a columnar compact and the thickness of a ring-shaped test piece to be described hereinafter are also set to "approximately" for the same reason.

Three cylindrical compacts having a diameter of 25 mm x a height of approximately 25 mm and having a single weight of 83 g were prepared at a compacting pressure of 588 MPa, and the pressure at the time of extraction was measured. The extraction pressure is an average value of such pressure. This extraction pressure needs to be 30 MPa or less.

A ring-shaped test piece having an outer diameter of 45 mm×an inner diameter of 33 mm×a thickness of approximately 5 mm, and having a single weight of 31 g was prepared, held in air at 350° C. for 20 minutes, and then air-cooled. The magnetic permeability and magnetic flux density of this ring-shaped test piece were measured using a magnetic measuring device manufactured by Metron, Inc. The magnetic permeability herein refers to a maximum magnetic permeability, and was measured with a primary winding number 200, a secondary winding number 50, and a maximum excitation magnetic field 10000 A/m. In addition, the magnetic flux density refers to a magnetic flux density at the excitation magnetic field of 10000 A/m.

Figure 2:
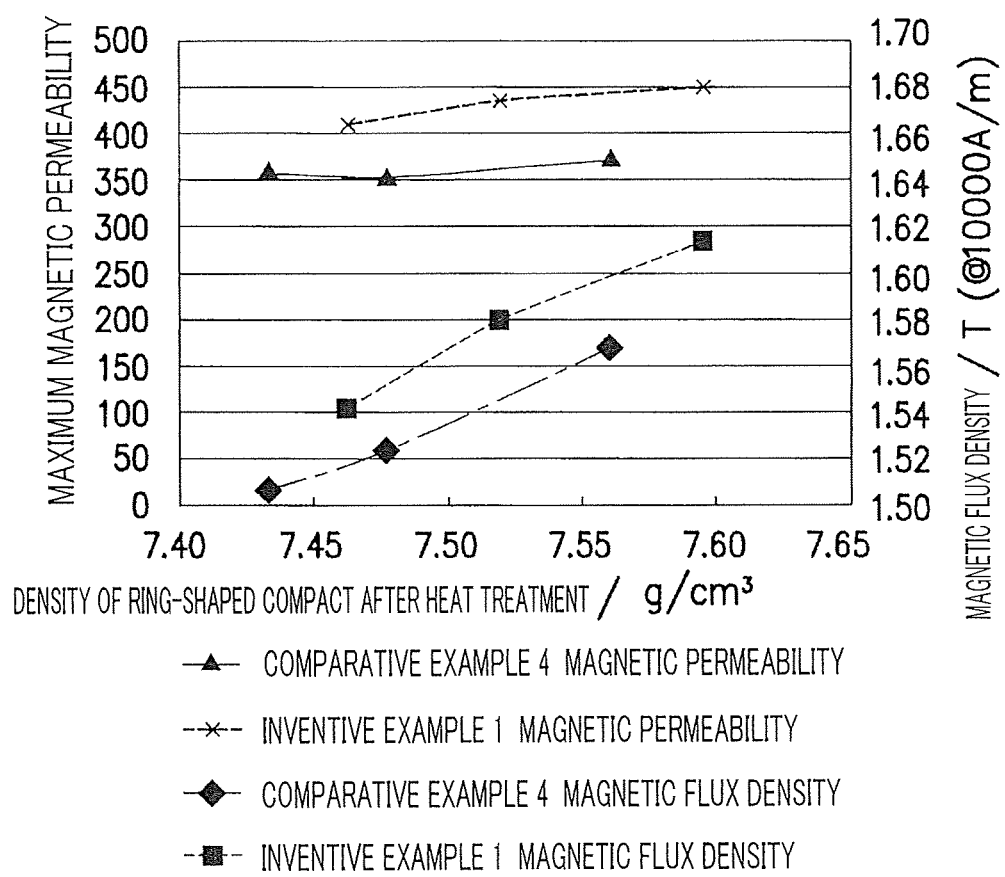
FIG. 2 is a graph illustrating the relationship among the compact density of a powder magnetic core, and the magnetic permeability and magnetic flux density.
Figure 3:
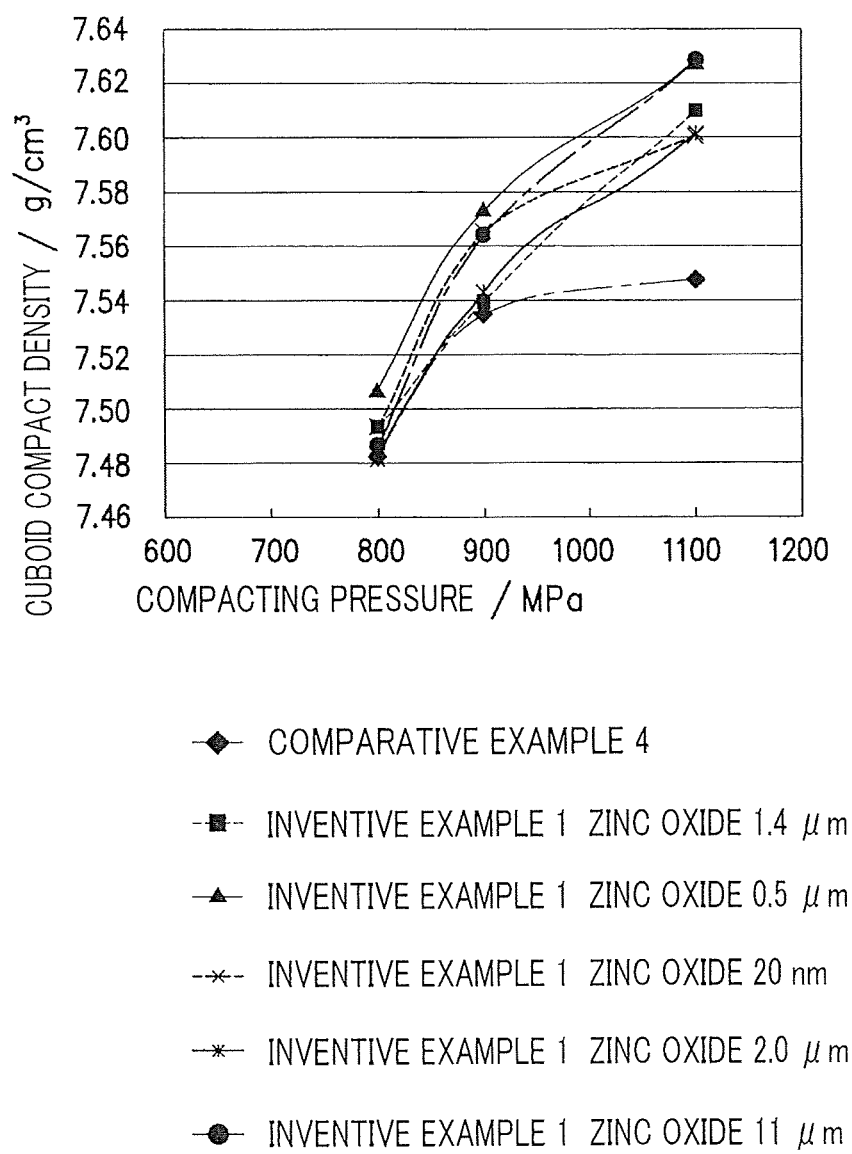
FIG. 3 is a graph illustrating the relationship between the compact density of a powder magnetic core in which a solid lubricant having various particle sizes is mixed and the compacting pressure at the time of compression molding.

Table 2 and FIGS. 1 to 3 show the compact density, extraction pressure, magnetic permeability and magnetic flux density obtained by these measurements. The compact density shown in Table 2 is a compact density when the compacting pressure was 900 MPa. In addition, the test data shown in Table 2 and the test data shown in FIGS. 1 to 3 differ slightly due to different batches of tests.

TABLE 2

|  | Lubricant | Solid lubricant | Total mass of lubricant | Compact density | Extraction pressure | Magnetic permeability | Magnetic flux density | Specific species | |
|---|---|---|---|---|---|---|---|---|---|
|  | % by mass | % by mass | % by mass | g/cm$^3$ | MPa |  | T | Lubricant | Solid lubricant |
| Comparative Example 1 | 0.24 | — | 0.24 | 7.60 | 31 | 425 | 1.61 | Stearamide | — |
| Comparative Example 2 | 0.26 | — | 0.26 | 7.59 | 31 | 414 | 1.60 | Stearamide | — |
| Comparative Example 3 | 0.28 | — | 0.28 | 7.57 | 29 | 406 | 1.60 | Stearamide | — |
| Comparative Example 4 | 0.3 | — | 0.3 | 7.54 | 26 | 351 | 1.52 | Stearamide | — |
| Inventive Example 1 | 0.2 | 0.1 | 0.3 | 7.57 | 27 | 437 | 1.58 | Stearamide | ZnO |
| Inventive Example 2 | 0.2 | 0.1 | 0.3 | 7.56 | 29 | 400 | 1.56 | Stearamide | MoS2 |
| Inventive Example 3 | 0.18 | 0.1 | 0.28 | 7.57 | 28 | 494 | 1.60 | Stearamide | ZnO |
| Inventive Example 4 | 0.18 | 0.2 | 0.38 | 7.54 | 24 | 474 | 1.59 | Stearamide | ZnO |
| Comparative Example 5 | 0.28 | — | 0.28 | 7.49 | 24 | 440 | 1.56 | Lauramide | — |
| Inventive Example 5 | 0.27 | 0.01 | 0.28 | 7.50 | 24 | 449 | 1.57 | Lauramide | ZnO |
| Inventive Example 6 | 0.255 | 0.025 | 0.28 | 7.51 | 24 | 445 | 1.56 | Lauramide | ZnO |

TABLE 2-continued

| | Lubricant | Solid lubricant | Total mass of lubricant | Compact density | Extraction pressure | Magnetic permeability | Magnetic flux density | Specific species | |
|---|---|---|---|---|---|---|---|---|---|
| | % by mass | % by mass | % by mass | g/cm$^3$ | MPa | | T | Lubricant | Solid lubricant |
| Inventive Example 7 | 0.23 | 0.05 | 0.28 | 7.52 | 25 | 443 | 1.56 | Lauramide | ZnO |
| Inventive Example 8 | 0.205 | 0.075 | 0.28 | 7.54 | 26 | 445 | 1.57 | Lauramide | ZnO |
| Inventive Example 9 | 0.18 | 0.1 | 0.28 | 7.54 | 27 | 442 | 1.57 | Lauramide | ZnO |

(Relationship Among Compact Density, Magnetic Permeability and Magnetic Flux Density)

According to Table 2 and FIG. 1, when comparing Comparative Example 4 with Inventive Example 1 in which the total mass of the lubricant is 0.3% by mass, the compact density in Inventive Example 1 in which a part of the lubricant is replaced with a solid lubricant of high density from the lubricant is higher than that in Comparative Example 4.

Also, according to Table 2 and FIG. 2, when comparing Comparative Example 4 with Inventive Example 1, the magnetic permeability and the magnetic flux density in Inventive Example 1 in which a part of the lubricant is replaced by a solid lubricant of high density from the lubricant are higher than that in Comparative Example 4. From the test results, it can be understood that the magnetic permeability and the magnetic flux density are improved when the compact density is increased.

(Influence of Particle Size of Solid Lubricant)

FIG. 3 shows an influence of the particle size of the solid lubricant (zinc oxide) in Inventive Example 1 on the compact density. From FIG. 3, it can be seen that the compact density in Inventive Example 1 was increased irrespective of the particle size of the zinc oxide, as compared with Comparative Example 4 in which all of the lubricant was used as a lubricant.

Particularly, when the particle size of zinc oxide is 20 nm (0.02 μm), 0.5 μm, and 11 μm, the compact density is higher than that of Comparative Example 4 at all compacting pressures. Among them, it can be said that zinc oxide having a particle size of approximately 0.5 μm is most preferable.

The particle size of zinc oxide can be measured with a measuring instrument (for example, Microtrack) using laser diffraction. The above-mentioned particle size shows a particle size D50 of 50% in terms of production degree.

(Reduction Effect of Extracting Pressure by Phosphoric Acid-Based Coating)

A soft magnetic powder and 0.3% by mass of stearamide as a lubricant were mixed and compression-molded at a compacting pressure of 600 MPa to prepare a cylindrical compact having a diameter of 25 mm×a height of approximately 25 mm, and the pressure and the compact density at the time of extracting the compact were measured. The soft magnetic powders used in the test were of three types including a sample No. 1 in which no coating was formed on its surface, a sample No. 2 which was subjected to water treatment to form an oxide coating on its surface, and a sample No. 3 having a phosphoric acid-based coating formed on its surface. The test results are shown in Table 3.

TABLE 3

| No. | Coating | Compact density g/cm$^3$ | Extraction pressure MPa |
|---|---|---|---|
| 1 | None | 7.26 | 30 |
| 2 | Oxide coating | 7.20 | 50 or more(Cancellation of measurement because of unable extraction) |
| 3 | Phosphoric acid-based coating | 7.22 | 21 |

According to Table 3, the extraction pressure of No. 1 having no coating on the surface of the soft magnetic powder was 30 MPa, whereas No. 2 in which an oxide coating was formed on the surface of the soft magnetic powder by water treatment could not extract the compact even if the extraction pressure was 50 MPa. On the other hand, the extraction pressure of No. 3 in which a phosphoric acid-based coating was formed on the surface was 21 MPa, and thus it can be understood that such formation of the phosphoric acid-based coating on the surface of the soft magnetic powder is effective on the reduction of the extraction pressure.

Generally, when forming a sintered part or the like, a lubricant of 0.5% by mass or more, preferably 0.75% by mass or more is usually mixed with the soft magnetic powder. However, since an inorganic insulating coating such as a phosphoric acid-based coating has lubricity, it was confirmed that even if the lubricant was reduced to 0.3% by mass or less, the extraction pressure was low and the compact density could be improved.

It is considered that the solid lubricant is poor in lubricity because the solid lubricant has a higher melting point than the organic lubricant used as a lubricant and does not melt during compression molding. However, since the inorganic insulating coating such as the phosphoric acid-based coating has lubricity, as in Inventive Example 4 of Table 2, addition of 0.2% by mass of a solid lubricant having poor lubricity does not lead to an increase in extraction pressure.

(Effect of Solid Lubricant Content)

From Table 2, when comparing Comparative Example 5 and Inventive Examples 5 to 9 in which the total mass of the lubricant was all 0.28% by mass, it can be found that the compact density, magnetic permeability, and magnetic flux density were improved even if the content of 0.01% by mass is substituted with a solid lubricant from a lubricant. In addition, even when the content of 0.1% by mass is substituted with a solid lubricant, it can be found that the compact density, magnetic permeability, and magnetic flux density were improved at the extraction pressure which is within an allowable range of 30 MPa or less.

Even if 0.2% by mass of a solid lubricant is added, such amount is effective for improving the compact density, magnetic permeability, and magnetic flux density. Since the zinc oxide density is 5.6 g/cm$^3$, which is 4 to 5 times the density of a lubricant, such as stearamide and lauramide, of approximately 1.2 g/cm$^3$, the amount of at least up to 0.4 mass % of the solid lubricant added with respect to 0.1% by mass of the lubricant is considered to be effective. However, since it is better to have a smaller total mass of the lubricant as described above, it is desirable that 0.2% by mass or less of the solid lubricant is added.

The present application is based on Japanese Patent Application No. 2015-113915 filed on Jun. 4, 2015, the contents of which are included in the present application.

The present invention has been adequately and sufficiently described through the embodiments in the foregoing with reference to the drawings and the like in order to express the present invention. However, it should be recognized that a person skilled in the art can easily change and/or modify the embodiments described above. Therefore, as long as changes or modifications made by a person skilled in the art are of a level that does not depart from the scope of the claims set forth in the claims, such changes or modifications are interpreted as being included in the scope of the claims set forth in the claims.

INDUSTRIAL APPLICABILITY

The present invention has a wide range of industrial applicability in the technical field of a powder mixture for powder magnetic core, as well as in the technical field of a powder magnetic core.

The invention claimed is:

1. A powder mixture, comprising
an organic lubricant,
an inorganic solid lubricant, and
a soft magnetic powder coated with an insulating coating,
wherein, relative to a total mass of the powder mixture,
a content of the organic lubricant is from 0.1% by mass to 0.8% by mass,
a content of the inorganic solid lubricant is from 0.01% by mass to 0.2% by mass,
a total content of the organic lubricant and the inorganic solid lubricant is from 0.28% by mass to 1.0% by mass,
wherein the inorganic solid lubricant consists of an inorganic compound having a density of 4.0 g/cm$^3$ or more, and comprises at least zinc oxide, and
wherein a density of the inorganic solid lubricant is twice or more a density of the organic lubricant.

2. The powder mixture according to claim 1, wherein the insulating coating is a phosphoric acid-based coating.

3. The powder mixture according to claim 1, wherein
the organic lubricant consists of an organic compound having a straight chain structure with 12 or more carbon atoms.

4. The powder mixture according to claim 1, wherein the inorganic solid lubricant is in the form of a powder having a particle size of from 20 nm to 20 μm.

5. The powder mixture according to claim 1, wherein the organic lubricant is at least one selected from the group consisting of a hydrocarbon, a fatty acid, an alcohol, an aliphatic amide, a metal soap, and an ester.

6. The powder mixture according to claim 1, wherein the powder mixture does not contain a metal soap.

7. A powder magnetic core, produced by compression molding of the powder mixture according to claim 1, followed by heat annealing.

* * * * *